US006793222B2

(12) United States Patent
Katsaounis et al.

(10) Patent No.: US 6,793,222 B2
(45) Date of Patent: Sep. 21, 2004

(54) OIL SCRAPER PISTON RING HAVING CIRCUMFERENTIALLY DISTRIBUTED RECESSES

(75) Inventors: Evangelos Katsaounis, Leverkusen (DE); Mario Solia, Köln (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 09/938,823

(22) Filed: Aug. 27, 2001

(65) Prior Publication Data

US 2002/0043769 A1 Apr. 18, 2002

(30) Foreign Application Priority Data

Aug. 25, 2000 (DE) .......................................... 100 41 803

(51) Int. Cl.[7] ................................................. F16J 9/12
(52) U.S. Cl. ..................... 277/459; 277/434; 277/493
(58) Field of Search ............................... 277/434, 435, 277/447, 458, 459, 460, 464, 465, 466, 493, 496, 497, FOR 101, 498, 499

(56) References Cited

U.S. PATENT DOCUMENTS

| 2,472,540 | A | * | 6/1949 | Meador | 277/441 |
| 2,579,698 | A | | 12/1951 | Phillips | |
| 3,378,268 | A | | 4/1968 | Anderson | |
| 3,787,059 | A | * | 1/1974 | McCormick | 277/435 |
| 3,811,692 | A | * | 5/1974 | Brenneke | 277/442 |
| 4,371,174 | A | * | 2/1983 | Gurtler | 277/434 |
| RE32,395 | E | * | 4/1987 | Geffroy et al. | |
| 5,308,089 | A | * | 5/1994 | Ishida | 277/443 |

FOREIGN PATENT DOCUMENTS

| DE | 1 101 070 | | 3/1961 |
| DE | 198 08 483 | | 9/1999 |
| JP | 6159135 | * | 6/1994 |
| JP | 6213327 | * | 8/1994 |

* cited by examiner

*Primary Examiner*—Robert J. Sandy
*Assistant Examiner*—Dinesh N Melwani
(74) *Attorney, Agent, or Firm*—Venable LLP; Stuart I. Smith; Chad C. Anderson

(57) ABSTRACT

An oil scraper piston ring includes an inner circumferential surface; an outer circumferential surface adapted to contact and slide along an inner wall of an engine cylinder; a radial wall thickness defined by a radial distance between the inner and outer circumferential surfaces; and a plurality of circumferentially distributed recesses each extending radially from the inner circumferential surface toward the outer circumferential surface to reduce the radial wall thickness. Each recess has a first recess region open at the inner circumferential surface and extending radially toward the outer circumferential surface and a second recess region merging into the first recess region. The two recess regions have different shapes, and the area of the second recess region is larger than the area of the first recess region.

9 Claims, 1 Drawing Sheet

OIL SCRAPER PISTON RING HAVING CIRCUMFERENTIALLY DISTRIBUTED RECESSES

CROSS REFERENCE TO RELATED APPLICATION

This application claims the priority of German Application No. 100 41 803.1 filed Aug. 25, 2000, which is incorporated herein by reference.

BACKGROUND OF THE INVENTION

This invention relates to an oil scraper piston ring for internal-combustion engines. The piston ring has an outer circumferential surface adapted to slide on the inner surface of the cylinder and further has, along its circumference, recesses which reduce the radial wall thickness. Each recess extends from the inner circumferential ring surface radially in the direction of the outer circumferential ring surface.

German published patent application 198 08 483 describes an oil scraper piston ring for internal-combustion engines. The piston ring has circumferentially distributed slots which extend axially through the entire ring cross section and form oil outflow openings and which, at the same time, increase the flexibility of the ring.

U.S. Pat. No. 3,378,268 describes a multi-part oil scraper piston ring which has two webs engaging the cylinder wall and which further has circumferentially distributed recesses which reduce the radial wall thickness and which extend from the inner circumferential ring surface inside toward the external circumferential ring surface. The recesses are triangular in cross section so that, similarly to the earlier-noted German published application 198 08 483, these recesses are essentially slots. The slots which taper as viewed from the cross section serve to accelerate the outflow of oil. The reference makes no mention of an increase of the ring flexibility.

A construction similar to the earlier-noted German published application 198 08 483 is described in German published application 11 01 070. According to this reference cuts are provided that extend from the inner circumference of the ring in the direction of its outer circumferential surface, whereby the moment of ring resistance may be limited.

It is disadvantage of the slit-like recesses disclosed in the prior art that garland formation during the winding of the sheet metal oil scraper piston rings is a potential risk.

The decisive parameter of the shape-conforming capability of oil scraper piston rings is the radial geometrical moment of inertia in addition to the tangential force. Such a moment of inertia depends from the radial wall thickness in the third power. In case the wall thickness is, for example, excessively reduced by providing too many slits, a simple installation of the piston ring into the engine cannot be performed.

SUMMARY OF THE INVENTION

It is an object of the invention to provide an improved oil scraper piston ring of the above-outlined type, whose ease of installation is preserved while its flexibility is optimized and its manufacturing costs are lowered, and furthermore, a reduction of the tension in the region of the smallest radial wall thickness can be achieved. It is a further object to provide an oil scraper piston ring, particularly the type which includes an expander spring, having a high degree of shape-conforming capability.

This object and others to become apparent as the specification progresses, are accomplished by the invention, according to which, briefly stated, the oil scraper piston ring includes an inner circumferential surface; an outer circumferential surface adapted to contact and slide along an inner wall of an engine cylinder; a radial wall thickness defined by a radial distance between the inner and outer circumferential surfaces; and a plurality of circumferentially distributed recesses each extending radially from the inner circumferential surface toward the outer circumferential surface to reduce the radial wall thickness. Each recess has a first recess region open at the inner circumferential surface and extending radially toward the outer circumferential surface and a second recess region merging into the first recess region. The two recess regions have different shapes, and the area of the second recess region is larger than the area of the first recess region.

By the purposeful geometric arrangement and configuration of the recesses according to the invention the flexibility of the oil scraper piston ring, its shape-conforming capability and sealing effect at the flanks are significantly increased. A risk of garland formation caused by the presence of slots is minimized and a reduction of the tension in the region of the smallest radial wall thickness is achieved.

According to a preferred embodiment of the invention the recesses provided in the piston ring have two recess regions which together form a generally mushroom-shaped outline. The longitudinal axes of the two regions are oriented approximately perpendicularly to one another and intersect approximately at the half height point of the larger recess region. The circumferentially measured width of the smaller region, extending from the inner circumferential ring surface and having parallel edges and is thus generally slot-shaped, is less than the circumferentially measured width of the larger region into which the smaller region merges.

The width of the smaller recess region is preferably smaller than the width (clearance) of the ring gap defined between the two end faces of the piston ring. This feature allows that the oil scraper piston rings may be sorted for further processing by gap sizes without the risks that during the sorting operation, the ring becomes seated on the sorting shaft with the smaller recess region.

BRIEF DESCRIPTION OF THE DRAWING

The sole

DESCRIPTION OF THE PREFERRED EMBODIMENT

Figure 1:
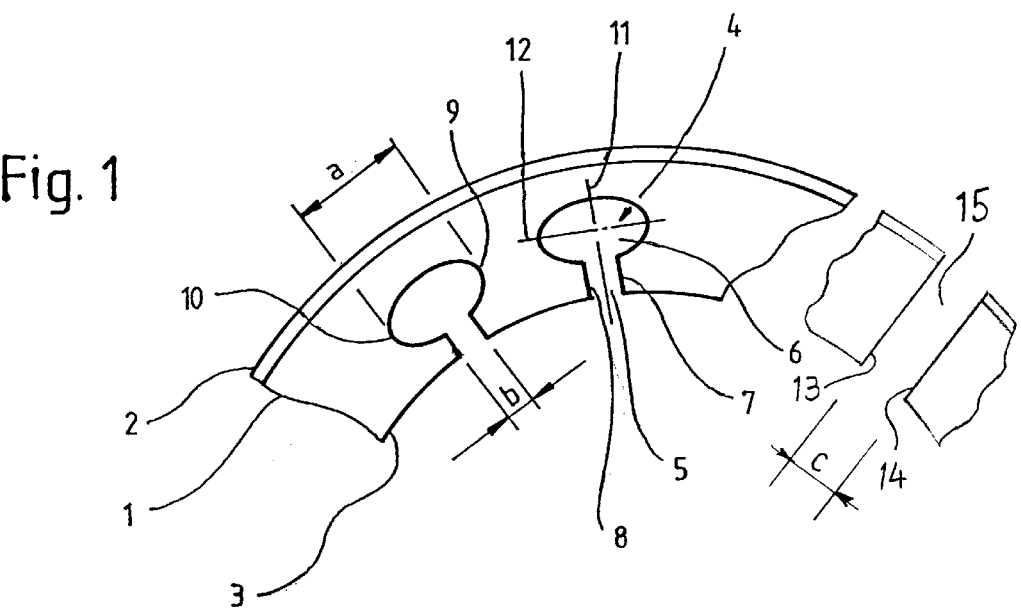
FIG. 1 is a fragmentary view of a piston ring according to the invention as viewed parallel to the ring axis extending perpendicularly to the drawing plane.

FIG. 1 shows a piston ring stamped from a sheet metal blank. The outer circumferential surface 2 is closed or continuous and constitutes a ring web adapted to engage and slide along an inner wall of an engine cylinder (not shown).

Starting from the inner circumferential ring face 3, circumferentially distributed recesses 4 are provided which are formed by stamping, and thus extend over the entire axial height of the ring. That is, the recesses 4 extend between the upper and lower surfaces of the ring and are open at these surfaces. Each recess 4 is composed of recess regions 5 and 6. The recess region 5 which is open radially inwardly, forms a slot whereas the region 6 into which the slot 5 merges, is elliptical having predetermined major and minor diameters. It is to be understood that other recess configurations of the recess region 6 are also feasible. The facing edges 7 and 8 of the slot 5 define a clearance b. The elliptical recess region 6 has a maximum (major) diameter a which is oriented approximately parallel to the ring circumference and which, according to the invention, is larger than b. Thus, the regions 5, 6 of the recesses 4 form a generally mushroom-shaped contour in which the longitudinal axes 11, 12 of the regions 5, 6 are oriented approximately perpendicularly to one another and intersect one another approximately at mid height of the region 6. By virtue of the configuration according to the invention the flexibility of the oil scraping piston ring is increased with recesses of simple shape, and the installation of the piston ring is facilitated. At the same time, a high degree of shape-conforming capability is achieved with superior sealing at the flanks. Also, the polygonal nature of the ring shape caused by winding is reduced.

The piston ring 1 further has end faces 13 and 14 which are oriented toward one another and which define a ring gap 15 having a width c which is greater than the clearance b.

It will be understood that the above description of the present invention is susceptible to various modifications, changes and adaptations, and the same are intended to be comprehended within the meaning and range of equivalents of the appended claims.

What is claimed is:

1. An oil scraper piston ring comprising a split ring having end faces oriented toward one another and defining a ring gap, and further including
   (a) an inner circumferential surface;
   (b) a closed outer circumferential surface adapted to contact and slide along an inner wall of an engine cylinder;
   (c) a radial wall thickness defined by a radial distance between said inner and outer circumferential surfaces; and
   (d) a plurality of circumferentially distributed recesses extending exclusively from said inner circumferential surface, with each recess extending radially from said inner circumferential surface toward said outer circumferential surface for reducing said radial wall thickness; each recess including
      (1) a first recess region open at said inner circumferential surface and extending radially toward said outer circumferential surface; said first recess region having a first contour shape and a first area; and
      (2) a second recess region merging into said first recess region and having a second contour shape and a second area; said second contour shape being different from said first contour shape and said second area being larger than said first area; and
   (e) said ring gap has a width larger than a circumferentially measured maximum dimension of said first recess region.

2. The oil scraper piston ring as defined in claim 1, wherein said first and second recess regions together constitute a mushroom-shaped configuration and wherein the circumferentially measured maximum dimension of said first recess region is less than a circumferentially measured maximum dimension of said second recess region.

3. The old scraper piston ring as defined in claim 1, wherein said first and second recess regions are elongated and each has a longitudinal axis; further wherein said longitudinal axes are oriented perpendicularly to one another and intersect in a point located approximately at a radial mid height of said second recess region.

4. The oil scraper piston ring as defined in claim 1, wherein said second contour shape is curvilinear.

5. The oil scraper piston ring as defined in claim 1, wherein said second recess region radially adjoins said first recess region.

6. The oil scraper piston ring as defined in claim 1, wherein said second contour shape is elliptical.

7. The oil scraper piston ring as defined in claim 1, wherein said first contour shape is a slot having parallel bordering edges defining a clearance constituting the circumferentially measured maximum dimension of the first recess region; said second contour shape is elongated and has a maximum dimension disposed generally perpendicularly to said bordering edges of said slot; and said clearance being smaller than said maximum dimension of said second contour shape.

8. The oil scraper piston ring as defined in claim 7, wherein said second contour shape is elliptical.

9. The oil scraper piston ring as defined in claim 1, wherein each recess extends over the entire axial height of the ring.

* * * * *